US012568070B2

(12) United States Patent
Jenkins et al.

(10) Patent No.: US 12,568,070 B2
(45) Date of Patent: Mar. 3, 2026

(54) SYSTEMS AND METHODS FOR MANAGING AND TRANSFERRING PERSONALIZED VEHICLE SETTINGS AND DIGITAL VEHICLE KEYS

(71) Applicants: Michael Jenkins, Auburn Hills, MI (US); Sarah Rowland, Ferndale, MI (US); Mohammed Aamer Hussain, Farmington Hills, MI (US); Scott Blaine, Grosse Pointe Shores, MI (US); Joerg Gerber, Rochester Hills, MI (US); Jamie G Blaine, Brighton, MI (US); Homa Roshanaei, Rochester Hills, MI (US)

(72) Inventors: Michael Jenkins, Auburn Hills, MI (US); Sarah Rowland, Ferndale, MI (US); Mohammed Aamer Hussain, Farmington Hills, MI (US); Scott Blaine, Grosse Pointe Shores, MI (US); Joerg Gerber, Rochester Hills, MI (US); Jamie G Blaine, Brighton, MI (US); Homa Roshanaei, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 541 days.

(21) Appl. No.: 17/488,496

(22) Filed: Sep. 29, 2021

(65) Prior Publication Data

US 2022/0109662 A1     Apr. 7, 2022

Related U.S. Application Data

(60) Provisional application No. 63/086,807, filed on Oct. 2, 2020.

(51) Int. Cl.
*G07C 9/00*        (2020.01)
*H04L 9/40*        (2022.01)

(52) U.S. Cl.
CPC ........ *H04L 63/062* (2013.01); *G07C 9/00174* (2013.01); *H04L 63/083* (2013.01);
(Continued)

(58) Field of Classification Search
None
See application file for complete search history.

(56) References Cited

U.S. PATENT DOCUMENTS 9,189,900 B1    11/2015  Penilla et al.
9,688,247 B1     6/2017  Jayaraman et al.
(Continued)

FOREIGN PATENT DOCUMENTS

CN          108933806 A     12/2018

OTHER PUBLICATIONS

Andrew Tanenbaum et al. "Computer Networks—Fifth Edition", Computer Networks fifth edition, Dec. 31, 2011, pp. 1-933.
(Continued)

*Primary Examiner* — K. Wong
(74) *Attorney, Agent, or Firm* — Jeremy J. Klobucar

(57) ABSTRACT

A communication system for digital key pairing of a vehicle includes a network transceiver configured for communication via one or more networks with at least one secure server, and a controller. The controller is configured to pre-provision the vehicle with pairing password verifiers for digital key programming to support digital key programming when the vehicle is offline with the at least one secure server, and/or provide end-to-end secure communication between the controller and the at least one secure server by generating and utilizing (i) at least one timestamp, (ii) at least one unique vehicle ID, and (iii) at least one random number in messages communicated between the controller and the at least one secure server.

5 Claims, 7 Drawing Sheets

(52) U.S. Cl.
CPC .... *H04L 63/20* (2013.01); *G07C 2009/00769* (2013.01); *H04L 2463/062* (2013.01)

(56) References Cited

U.S. PATENT DOCUMENTS

| | | | | |
|---|---|---|---|---|
| 10,266,148 | B2 * | 4/2019 | Mohaupt | B60R 25/252 |
| 10,384,643 | B2 * | 8/2019 | Pudar | B60R 25/209 |
| 10,437,977 | B2 | 10/2019 | Lambert et al. | |
| 11,777,936 | B2 * | 10/2023 | Galdo | H04W 12/084 |
| | | | | 713/156 |
| 2014/0002238 | A1 * | 1/2014 | Taveau | G07C 9/257 |
| | | | | 340/5.53 |
| 2020/0052905 | A1 * | 2/2020 | Mathias | H04L 9/3265 |
| 2020/0216077 | A1 * | 7/2020 | Nölscher | H04L 67/306 |
| 2020/0339064 | A1 * | 10/2020 | Gengler | G07C 9/00571 |

OTHER PUBLICATIONS

International Search Report and Written Opinion dated Jan. 4, 2022, International Application No. PCT/US2021/ 052869, International Filing Date Sep. 30, 2021.

* cited by examiner

SYSTEMS AND METHODS FOR MANAGING AND TRANSFERRING PERSONALIZED VEHICLE SETTINGS AND DIGITAL VEHICLE KEYS

CROSS REFERENCE TO RELATED APPLICATION

This application claims the benefit of U.S. Prov. App. No. 63/086,807 filed Oct. 2, 2020, the contents of which are incorporated herein by reference thereto.

FIELD

The present application generally relates to vehicle personalization and sharing and, more particularly, to systems and methods for managing and transferring personalized vehicle settings and digital vehicle keys.

BACKGROUND

Some vehicles include digital key technology to enable a smartphone to function as a key for a vehicle. To support digital key programming, a communication link is required. However, in certain scenarios when the vehicle cannot connect to required servers (e.g., remote area, parked in underground structure), the digital key programming cannot be accomplished. Further, during programming, use of standard security protocols can potentially open communications to unintended users (e.g., hackers). Additionally, conventional vehicles are limited in their personalized settings. One conventional example of personalized vehicle settings is predefined seat position settings stored at the vehicle and initiated by a particular key fob or button setting. Other non-limiting examples of personalized settings include radio presets/settings, temperature/climate control settings, navigation settings, mirror position settings, access/settings for third-party application, such as music streaming applications, and the like. While typically stored locally in one vehicle, however, these personalized vehicle settings are not easily transferrable to another vehicle. In addition, there is not a way to limit certain vehicle settings during operation, such as by a particular driver (a friend, a child/minor, etc.). Accordingly, while conventional vehicle setting personalization systems and digital key programming do work well for their intended purpose, there exists an opportunity for improvement in the relevant art.

SUMMARY

In accordance with one example aspect of the invention, a communication system for digital key pairing of a vehicle is provided. In one example implementation, the communication system includes a network transceiver configured for communication via one or more networks with at least one secure server, and a controller. The controller is configured to pre-provision the vehicle with pairing password verifiers for digital key programming to support digital key programming when the vehicle is offline with the at least one secure server, and/or provide end-to-end secure communication between the controller and the at least one secure server by generating and utilizing (i) at least one timestamp, (ii) at least one unique vehicle ID, and (iii) at least one random number in messages communicated between the controller and the at least one secure server.

In addition to the foregoing, the described communication system may include one or more of the following features:

wherein the controller is configured to pre-provision the vehicle with pairing password verifiers, and wherein the controller is further configured to receive a notification message from the at least one secure server requesting the pairing password verifiers, verify the notification message, request password verifiers from the at least one secure server, receive and verify the password verifiers, and accept and store the password verifiers, wherein with the password verifiers stored, a user may now program one or more digital keys when the vehicle is offline with the at least one secure server.

In addition to the foregoing, the described communication system may include one or more of the following features: wherein the at least one secure server sends the notification message once (i) a user completes a vehicle enrollment by generating an account with a system provided by the OEM of the vehicle, (ii) the at least one secure server generates password verifiers, and (iii) the at least one secure server stores the pairing password verifiers part of the password verifiers; wherein the password verifiers are SPAKE2+; and wherein the vehicle further includes a digital key module configured to manage digital key functions for vehicle access and start functionalities.

In addition to the foregoing, the described communication system may include one or more of the following features: wherein the controller is configured to provide the end-to-end secure communication between the digital key module and the at least one secure server, wherein the at least one secure server is configured to (i) generate and include the at least one timestamp in its messages to the digital key module, and (ii) include the at least one unique vehicle ID in its messages to the digital key module, the unique vehicle ID assigned only to one specific vehicle at a time of digital key service provisioning, and wherein the digital key module is configured to generate and include the at least one random number in its messages to the at least one secure server.

In addition to the foregoing, the described communication system may include one or more of the following features: wherein the digital key module is further configured to verify, for each message received, that the unique vehicle ID associated with that message matches the unique vehicle ID of the vehicle before processing the received message, and verify, for each message received, the timestamp is less than a predetermined threshold before processing the received message, to thereby facilitate rejecting outdated data from the at least one secure server; and wherein the at least one secure server is configured to forward the received random number in any response to the digital key module, and wherein the digital key module is further configured to verify the received random number in any message from the at least one secure server matches the previously generated random number before processing the message from the at least one secure server to confirm data security.

In addition to the foregoing, the described communication system may include one or more of the following features: wherein the network transceiver is a telematic box module (TBM) configured to provide cellular connectivity to the vehicle, and wherein the vehicle further includes a security gateway (SGW) configured to securely send messages between the TBM and the digital key module; and wherein the controller is configured to both pre-provision the vehicle with the pairing password verifiers and provide the end-to-end secure communication between the controller and the at least one secure server.

In accordance with another example aspect of the invention, a communication system for a vehicle is provided. In one example implementation, the communication system includes a network transceiver configured for communication via one or more networks with (i) at least one secure server, and (ii) an authorized mobile device, and a controller. The controller is configured to detect the authorized mobile device, receive personalized user settings from the mobile device or the at least one secure server, the personalized user settings set by a user of the authorized mobile device, automatically adjust one or more systems and/or components of the vehicle according to the received personalized user settings, and upload the personalized user settings to the at least one secure server for storage. The at least one secure server is configured to send the personalized user settings to one or more additional vehicles upon the one or more additional vehicles detecting the authorized mobile device such that systems and/or components of the one or more additional vehicles are automatically adjusted to the personalized user settings.

In addition to the foregoing, the described communication system may include one or more of the following features: wherein the controller is further configured to receive updated personalized user settings from the mobile device or the at least one secure server, the updated personalized user settings updated by the user of the authorized mobile device, and automatically adjust the one or more systems and/or components of the vehicle according to the received updated personalized user settings; and wherein detecting the authorized mobile device further includes determining whether the user of the mobile device has a user profile, and if no user profile is found, prompting the user to create a new profile on the mobile device and storing the new profile at the at least one secure server.

In addition to the foregoing, the described communication system may include one or more of the following features: wherein the controller is further configured to send, based on a command from the user at the vehicle or the authorized mobile device, the current user settings of the vehicle to the authorized mobile device to be subsequently named and saved; wherein the personalized user settings include mirror position settings, steering wheel position, one or more button control settings, radio settings, media subscription credentials/settings, seat position settings, climate control settings, and navigation settings; and wherein the personalized user settings include digital key settings.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
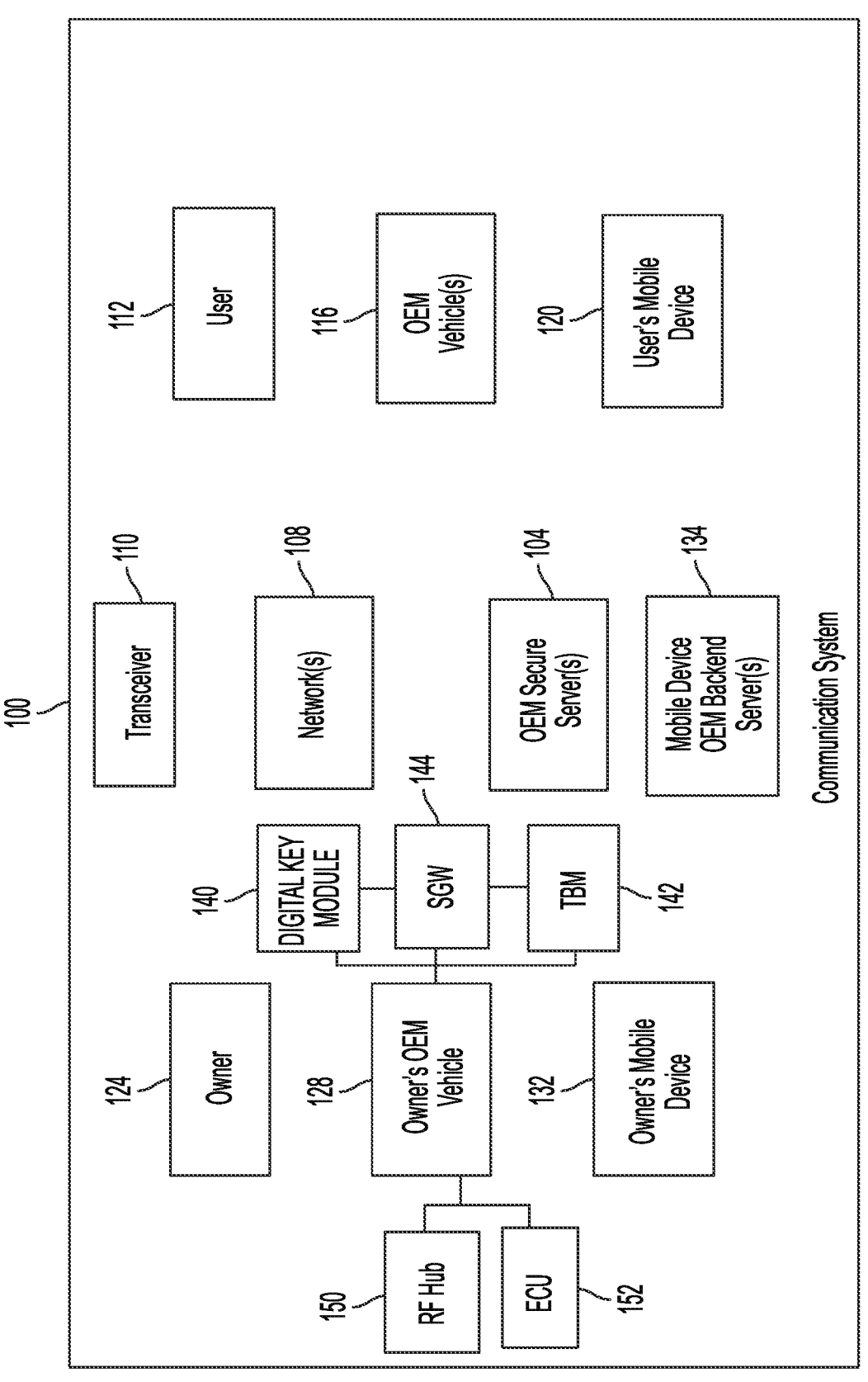
FIG. 1 is a functional block diagram of an example communication system amongst one or more of vehicles, mobile devices, and secure servers via one or more networks according to the principles of the present disclosure.

As previously discussed, there exists an opportunity for improvement in the art of vehicle setting personalization systems and methods. For example, one conventional personalization setting is predefined seat position settings stored at the vehicle and initiated by a particular key fob or button setting. Even this one personalized setting, however, is not easily transferrable between vehicles. Moreover, these is no easy way to limit certain vehicle settings during operation, such as by a particular driver (a friend, a child/minor, etc.). Accordingly, and with reference to FIG. 1, improved systems and methods for providing personalized vehicle settings and digital vehicle keys are presented. In FIG. 1, an example communication system 100 is illustrated. The techniques of the present disclosure provide for the creation and management of user accounts, which are stored at one or more secure server(s) 104 (e.g., in the cloud), which for example, are owned and operated by a particular vehicle original equipment manufacturer (OEM) and are only accessible to authorized users, such as a particular type or brand of vehicle. These user accounts are able to define a plurality of personalized settings.

The communication system 100 further comprises one or more networks 108, one or more OEM vehicles 112, and a user 116 and their mobile device 120. Also illustrated as part of the communication system 100 are an owner 124 and their OEM vehicle 128 and their mobile device 132, which will be discussed in greater detail below in relation to vehicle digital keys. When the user 112 accesses one of the OEM vehicle(s) 116 (hereinafter, "OEM vehicle 116"), he/she can login to their user account (e.g., using a password or pin number) directly via an infotainment unit (not shown) of the OEM vehicle 116 using their mobile device 120 and one of the network(s) 108 (e.g., a short-range wireless communication protocol, such as Bluetooth) to access the user profile and transfer some or all of their personalized settings to the OEM vehicle 116. In one example, a wireless transceiver system 110 could be built into a head-unit or infotainment system (e.g., unit with a touch display) of the vehicles.

In some implementations, there could be a "save password" option to remove the need to repeatedly enter a password or pin number to login to the user account. The mobile device 120 could also already be logged into the user account and thus could be "authenticated" to allow the user account personalized settings to be accessed by the OEM vehicle 116.

The creation and management of the user account could be performed via a web browser, a mobile application, or the like. The transfer of the personalized setting(s) could be automatic or could be initiated by a command from the user 112 via the infotainment unit or via their mobile device 120. Non-limiting examples of personalized vehicle settings include radio presets/settings, media subscription credentials/settings, seat position settings, temperature or climate control settings, navigation settings, suspension settings and the aforementioned digital key settings. Some settings, such as advanced driver assistance (ADAS) settings, may be excluded from the user account personalized settings for safety reasons.

It will be appreciated that the above-described personalized settings are merely examples and that the user account could store and transfer to the OEM vehicle 116 any suitable vehicle settings (mirror position settings, steering wheel position and button control settings, garage door code settings, external profile settings, such as what modifications have been made to the particular vehicle and are visible/viewable to other users, etc.).

These techniques could be particularly useful, for example, when the user 112 is often accessing a plurality of different vehicles, such as when renting vehicles during traveling for leisure or for business. This would also provide an incentive for the user 112 to repeatedly buy, rent, or otherwise desire access to only vehicles of a particular OEM due to the easy transferability of their personalized settings from their user account and thus consistent and personalized in-vehicle experiences and/or for commercial/fleet vehicle companies to offer the OEM's vehicles, thereby increasing customer loyalty and retention and increasing OEM vehicle sales. The user 112 can also easily change or edit the personalized settings in their user profile at the OEM secure server(s) 104 via their mobile device 120 or another suitable computing device via the one or more network(s) 108. This eliminates the need to repeatedly adjust settings via the OEM vehicle(s) 116 themselves (e.g., via the infotainment unit and/or other in-vehicle actuators).

In one example, the user 112 utilizes their mobile device 120 to (i) retrieve vehicle preferences, (ii) send selected profile to vehicle 116, and (iii) update configured preferences. To retrieve vehicle preferences, the user 112 initiates a pair with the vehicle via mobile device 120 (e.g., using an application) and network(s) 108 (e.g., wi-fi direct client, Bluetooth, etc.). The user 112 initiates a command to get the Current Preferences of vehicle 116. The vehicle 116 retrieves the preferences (e.g., via head unit APIs) and sends them to mobile device 120 for the user 112 to name and save.

To send the selected profile to vehicle 116, the user 112 initiates a pair with the vehicle 116 via mobile device 120 and network(s) 108. The user 112 selects a desired profile and initiates a preferences sync with the head unit, which then applies the preferences to the vehicle 116. To update the configured preferences, the user 112 utilizes the mobile device 120 and selects a Configure Preferences option and names or selects a saved profile. The mobile device 120 updates and saves the updated preferences, which will be available the next time the mobile device 120 connects with the vehicle 116 via network(s) 108.

According to other aspects of the present disclosure, digital vehicle key creation and management techniques are presented. The terms "digital key" and "digital vehicle key" as used herein refer to the utilization of a computing device and not an actual vehicle key fob, to access and operate a vehicle according to a defined set of rules/authorizations. For purposes of this disclosure, owner 124 is the owner of OEM vehicle 128 and has a mobile device 132. One or more digital keys can be created by the owner 124 for OEM vehicle 128 or another owner-level authorized user via their user account at the OEM secure server(s) 104 using their mobile device 132 or another suitable computing device. For example only, there could be a limit of 10 digital keys at a given time for a particular account/vehicle, but it will be appreciated that there could be a different limit or no limit to the quantity of digital keys created and managed for a particular account/vehicle.

Once a digital key is created, it can be shared with another user or group of users, but for purposes of this description the sharing will be with user 112. The sharing procedure could involve, for example, associating or otherwise connecting the created digital key with the user account of the user 112. For example only, this sharing could be conveyed to the user 112 through a web browser, a mobile application, email, text messaging, or the like. In some implementations, a note or message could be attached (e.g., by the owner 124) to the digital key (e.g., "Enjoy my car today!"). Once obtaining the digital key, the user 112 can then access the owner's OEM vehicle 128 using their user account (e.g., via an infotainment unit (not shown) of the owner's OEM vehicle 128 or via their mobile device 120). The digital key can also define one or more permissions or levels of access as specified by the owner 120. In some implementations, there could be preset permissions (admin, child, etc.) and/or custom permissions (e.g., a la carte settings).

Non-limiting examples of these types of permissions include time/duration that the digital key will be valid (e.g., a start and end time), specific vehicle services/features that will be accessible to the user 112 (e.g., media subscription access or vehicle cellular data network access), and other vehicle operation-related features (geographic area for operation, vehicle speed limits, etc.). In some implementations, the owner 124 is able to monitor the usage of their vehicle 128 during the digital key period. For example, the owner 124 could monitor the location and/or the operation (e.g., speed) of their vehicle 128. The owner 124 could also be provided with notifications (via a web browser, mobile application, email, text messaging, etc.) relating to their vehicle 128. For example only, the owner 124 could be sent a push notification to their mobile device 132 both when the user 112 starts and ends a trip with the vehicle 128. It will be appreciated that the types/quantities of notifications could be predefined or could be specified by the owner 124.

The digital key creation, management, and sharing techniques of the present disclosure also provide benefits outside of peer-to-peer (P2P) sharing (friend, family, colleague, etc.). In some implementations, a digital key could be shared by the owner 124 with a service center that requires temporary access to the vehicle 128 for services such as, but not limited to, cleaning, maintenance, delivery, refueling, refilling, and the like. For example, digital key sharing could be easily shareable with an OEM service center, thereby providing an incentive to utilize OEM-operated service centers instead of third-party service centers. Additional media as a service (MaaS) offerings could be enabled by these digital key techniques for OEM-specific applications and for third-party applications (e.g., ride-sharing applications). In some implementations, a digital key could be shared with a rental user, which could provide the owner 124 with a monetary stream when their vehicle 128 is not being used and could also provide partnering benefits with a car-sharing rental company.

In some implementations, digital keys could be utilized by fleet rental and fleet commercial companies, which typically struggle with physical key management, particularly for larger fleets. Fleet rental companies, for example, often indicate physical key management to be one of their top issues. Fleet commercial companies also often indicate physical key management to be one of their top issues and thus can even have dedicated groups of employees assigned solely to physical key management. The digital key techniques of the present disclosure thus provide for strong cost savings and monetization opportunities, such as by partnering with mobility companies/firms providing access to mobile keys via application programming interfaces (API) in a safe and secure manner.

Figure 2:
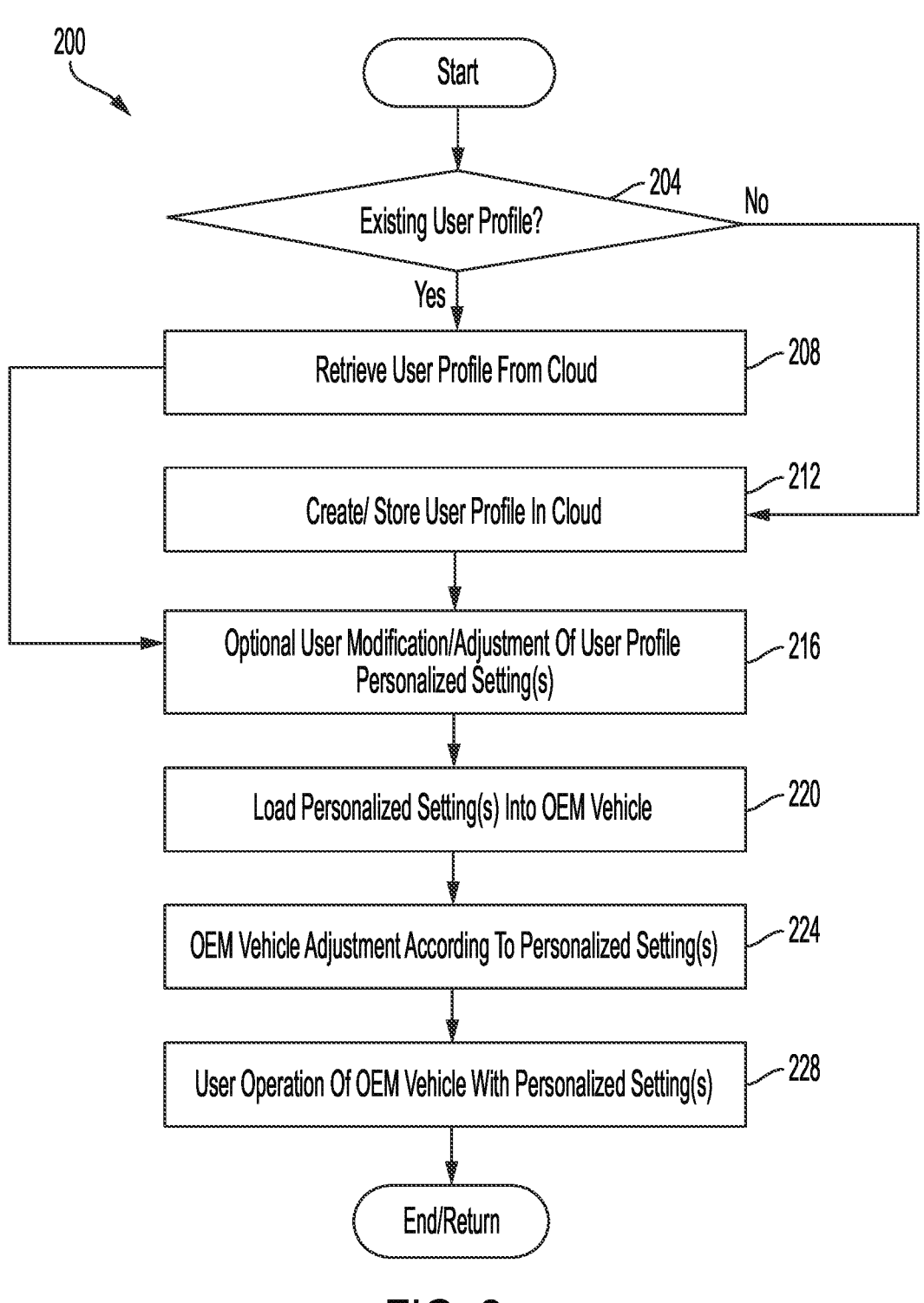
FIG. 2 is a flow diagram of an example method of user profile creation and management and personalized setting(s) loading from the user profile into a vehicle according to the principles of the present disclosure.

Referring now to FIG. 2, a flow diagram of an example method 200 of user profile creation and management and loading personalized setting(s) from the user profile into a vehicle according to the principles of the present disclosure is illustrated. This method 200 is applicable, for example, to any of the OEM vehicles described previously herein. At 204, it is determined whether a user has a user profile. When true, their user profile is retrieved at 208 (e.g., from the OEM secure server(s) 104). When false, a new user profile is created and stored in the cloud (e.g., at the OEM secure server(s) 104) at 212. At 216, the user optionally edits their personalized setting(s) in the user profile (e.g., using their mobile device).

At 220, some or all of the personalized setting(s) in the user profile are loaded into an OEM vehicle that the user is accessing. This could include, for example, prompting the user for credentials/authentication and to confirm which (if any) personalized settings the user wants loaded into the OEM vehicle. At 224, the OEM vehicle adjusts its setting(s) according to the personalized setting(s) loaded from the user profile. At 228, the user operates the OEM vehicle with any of their personalized setting(s) having been seamlessly loaded into the OEM vehicle, thereby improving their driving experience. The method 200 then ends or returns to 204.

Figure 3:
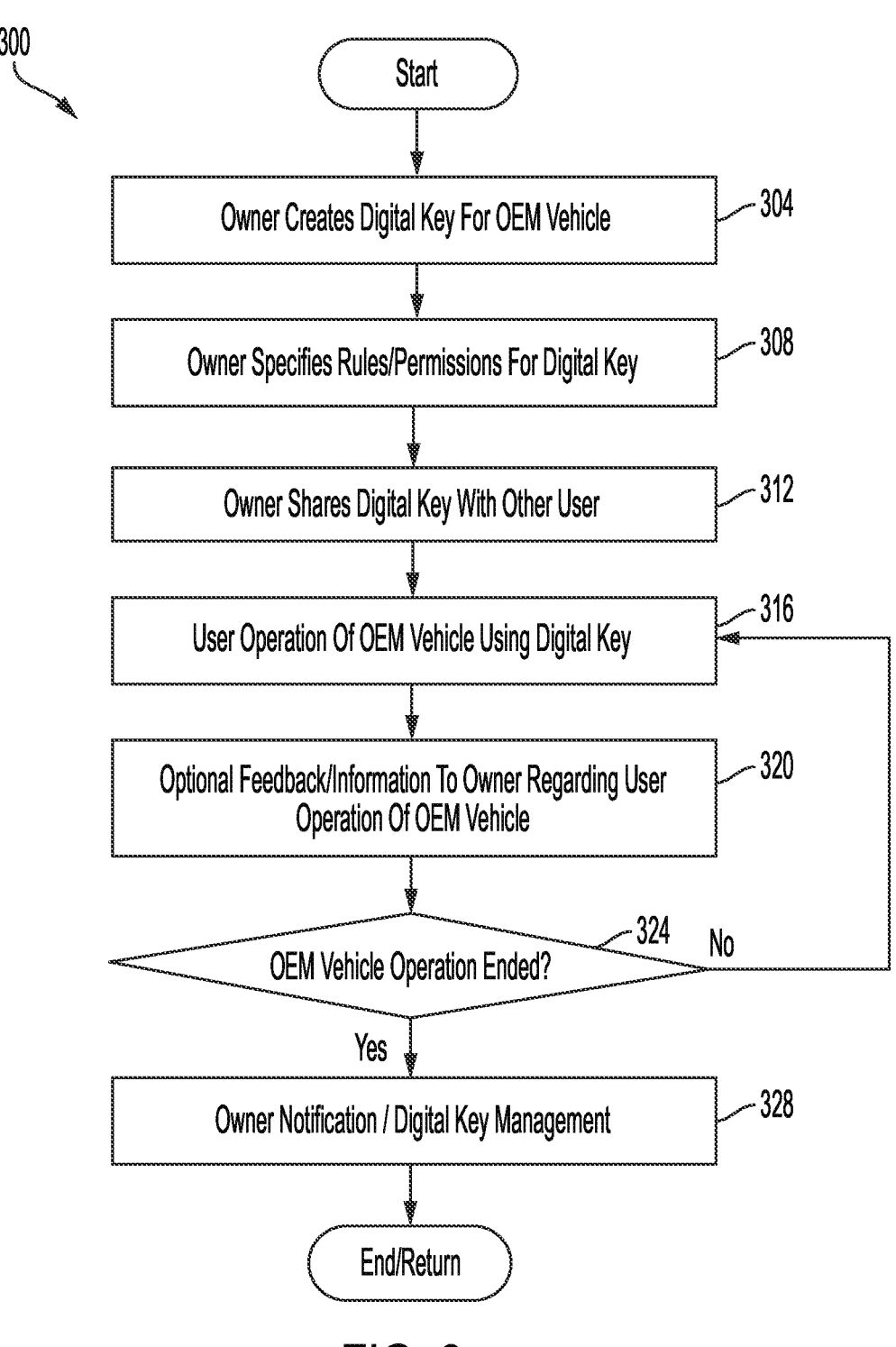
FIG. 3 is a flow diagram of an example digital key creation, management, and sharing method for a vehicle according to the principles of the present disclosure.

Referring now to FIG. 3, a flow diagram of a digital key creation, management, and sharing method 300 according to the principles of the present disclosure is illustrated. This method 300 is applicable, for example, to any of the OEM vehicles described previously herein. At 304, the owner of the OEM vehicle creates a digital key for the OEM vehicle (e.g., using their mobile device). At 308, the owner specifies a set of rules/permissions for the created digital key. At 312, the owner shares the digital key with another user, thereby granting them temporary access to the OEM vehicle according to the specified rules/permissions. At 316, the user begins operation of the OEM vehicle.

At optional 320, the owner receives feedback/information regarding the operation of the OEM vehicle by the user. At 324, it is determined whether the user has ceased operation of the OEM vehicle (e.g., in response to the digital key expiring). When true, the method 300 proceeds to 328. When false, the method 300 returns to 320. At 328, the owner of the OEM vehicle is notified of the status of the digital key upon which he/she can take some sort of action with respect to that digital key (modification, deletion, renewal/extension, etc.). The method 300 then ends or returns to 304.

According to other aspects of the present disclosure, additional features of the digital key creation and management are presented. To enable mobile device 132 to function as a key for vehicle 128, a digital key is programmed at both the mobile device 132 and the vehicle 128. Programming the digital key requires communication between the mobile device 132, the vehicle 128, the OEM backend server 104, and one or more mobile device OEM backend servers 134 (see FIG. 1).

With continued reference to FIG. 1, the vehicle 128 additionally includes a "mobile device as a key" module 140, a telematics box module (TBM) 142, and a security gateway (SGW) 144, which communicate with the OEM secure server(s) 104. The digital key module 140 functions as the digital key master and is configured to manage all digital key functions for vehicle access and start functionalities. The TBM module 142 is configured to function as a modem and is configured to provide cellular (or other) connectivity to the vehicle 128. The SGW 144 is configured to forward pre-provisioned and clean CAN messages from the TBM module 142 to the digital key module 140.

In order to program mobile device 132 with vehicle 128 (i.e., generate a digital key), a pairing password is communicated from the OEM secure server 104 to the vehicle 128, and pairing password verifiers are communicated from the OEM secure server 104 to the vehicle 128. Both the pairing password and its corresponding verifiers are utilized at the time of mobile device pairing. Thus, to support digital key programming, a communication link is required between OEM secure server 104 and the vehicle 128. Accordingly, the vehicle is required to be online and connected to the OEM secure server 104 during digital key programming procedures. However, in certain scenarios when the vehicle cannot connect to the OEM secure servers 104 (e.g., remote area, parked in underground structure), the digital key programming cannot be accomplished. Advantageously, the described systems and methods allow secure and reliable digital key programming while the vehicle is offline, as described herein in more detail.

Figure 4:
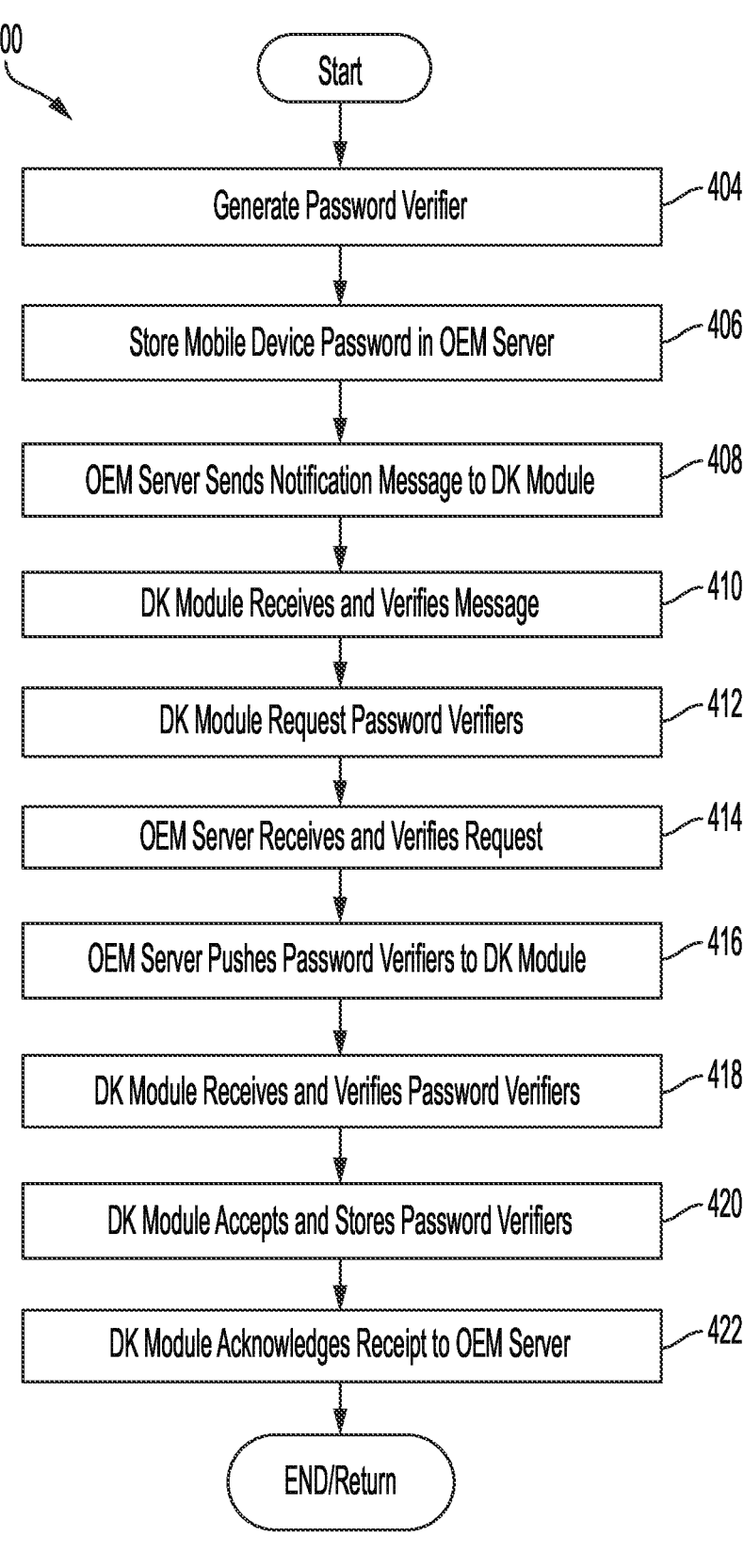
FIG. 4 is a flow diagram of an example method of pre-provisioning a vehicle with pairing password verifiers for digital key programming with an offline vehicle, according to the principles of the present disclosure.

Referring now to FIG. 4, a flow diagram of an example method 400 of pre-provisioning a vehicle with pairing password verifiers for digital key programming with an offline vehicle, according to the principles of the present disclosure is illustrated. In a general example, the backend server is configured to send the password verifier ahead of time when an online connection is established. At the time of pairing, no online connection between the vehicle and the backend is required to complete the pairing since the vehicle was preloaded with the password verifier. As such, there may be a time gap (e.g., months or even years) before the password verifier that is preloaded into the vehicle is used.

This method 400 is applicable, for example, to any of the OEM vehicles described previously herein. At 404, once user vehicle enrollment is complete, OEM server 104 generates a password verifiers (e.g., SPAKE2+). In one example, user enrollment includes creating or generating an account with a system provided by the vehicle OEM and which interacts with the OEM vehicle 128. At 406, the OEM server 104 stores a mobile device part of the protocol (i.e., a pairing password) for later use. At 408, the OEM server 104 sends a notification message (e.g., called SPAKE2_NTF) to the digital key module 140 to request the password verifiers.

At 410, the digital key module 140 receives and verifies the notification message (SPAKE2_NTF). At 412, the digital key module then requests password verifiers (e.g., called SPAKE2_REQ) from the OEM server 104. At 414, the OEM server 104 receives and verifies the request (SPAKE2_REQ). At 416, the OEM server 104 pushes password verifiers (e.g., called SPAKE2_RES) to the digital key module 140. At 418, the digital key module 140 receives and verifies the password verifiers (SPAKE2_RES). At 420, the digital key module 140 accepts and stores the password verifiers. At 422, the digital key module 140 acknowledges receiving the password verifiers to the OEM server 104. With the password verifiers stored in the digital key module 140, owner 124 may now program one or more digital keys when the vehicle 128 is offline.

Further, while there are many known standard security protocols to provide end to end secure communication between the digital key module 140 and the OEM server 104, such known protocols are based on a two communication end points model (i.e., the backend server and the vehicle). At a detail level and from the vehicle side, the communication endpoint includes multiple modules communicating via the vehicle bus (not shown). This makes it difficult for such conventional security protocols to be used. For example, some standard protocols will either limit the usability of the in-vehicle messages or fail to provide the required security protection in the vehicle bus (e.g., allow a hacker to manipulate/inject messages on the vehicle bus). Advantageously, however, the described systems and methods ensure data freshness, uniqueness, and preserve integrity as the messages travel internally between the in-vehicle modules (e.g., 140, 142, 144) or externally between the vehicle 128 and the OEM secure server(s) 104. In particular, the system provides protection for both vehicle initiated communication and well as backend initiated communication, as described herein in more detail.

Figure 5:
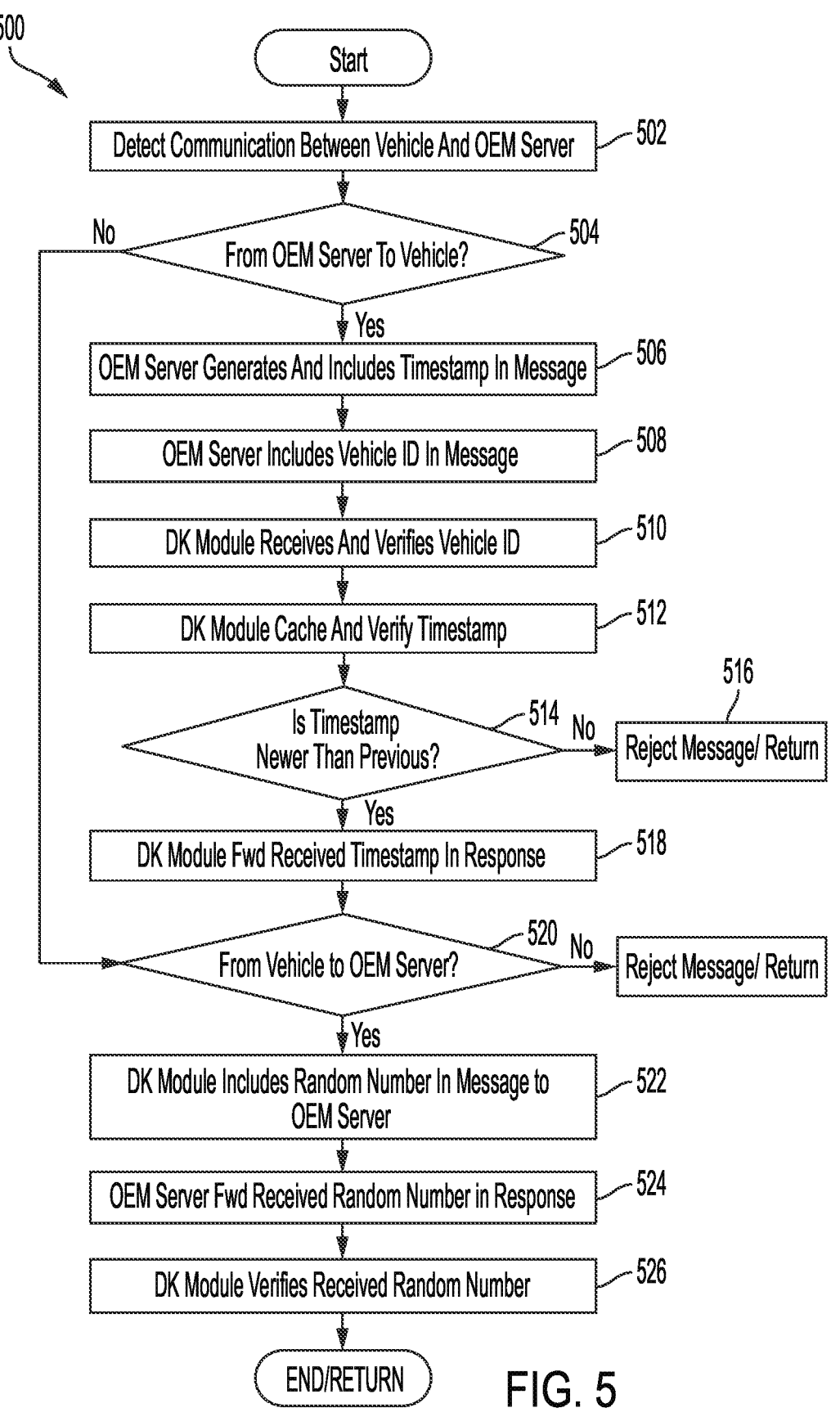
FIG. 5 is a flow diagram of an example method of secure communication between a vehicle and OEM secure servers according to the principles of the present disclosure.

Referring now to FIG. 5, a flow diagram of an example method 500 for improving performance and security for any communication between the vehicle 128 and the OEM secure servers 104, according to the principles of the present disclosure is illustrated. This method 500 is applicable, for example, to any of the OEM vehicles described previously herein. At 502, a communication is detected. At 504, the method determines if the communication is from the OEM server 104 to the vehicle 128 (e.g., the digital key module 140). If no, the method 500 proceeds to 520. If yes, at 506, the OEM server 104 generates and includes a timestamp in its messages to the digital key module 140. At 508, the OEM server 104 includes a Vehicle ID in its message to the digital key module 140. In one example the Vehicle ID is a unique ID assigned for each vehicle at the time of digital key service provisioning.

At 510, the digital key module 140 receives the message and verifies that the Vehicle ID received in the communication matches its stored Vehicle ID before processing the messages from the OEM server 104. This process provides data uniqueness by allowing the digital key module 140 to validate that the data received from the OEM server 104 is intended for this specific vehicle 128.

At 512, the digital key module 140 caches and verifies the timestamp before processing the message from the OEM server 104. At 514, the digital key module 140 determines if the timestamp is greater than a predetermined threshold (e.g., is the timestamp greater/newer than the previously received timestamp). If no, at 516, the message is rejected. This process guarantees data freshness by enabling the digital key module to recognize and reject outdated data coming from the OEM server 104. If yes, at 518, the digital key module 140 forwards the received timestamp in its response to the OEM server 104. This measure facilitates guaranteed data security by allowing the OEM server 104 to verify that the received digital key module response is linked to the original OEM server request.

At 520, the method determines if the communication is from the vehicle 128 (e.g., digital key module 140) to the OEM servers 104. If no, the method 500 ends. If yes, at 522, the digital key module 140 includes a random number (e.g., called RND) in its messages to the OEM servers 104. At 524, the OEM server 104 forwards the received RND it its response to the digital key module 140. At 526, the digital key module 140 verifies the received RND matches the previously generated RND before processing the messages from the OEM servers 104. This process is configured to guarantee data security by allowing the digital key module to verify that the receives OEM server response is linked to the original digital key module request. As such, the method 500 is configured to provide data freshness, uniqueness, and integrity in messages communicated between the vehicle 128 and OEM servers 104.

Figure 6:
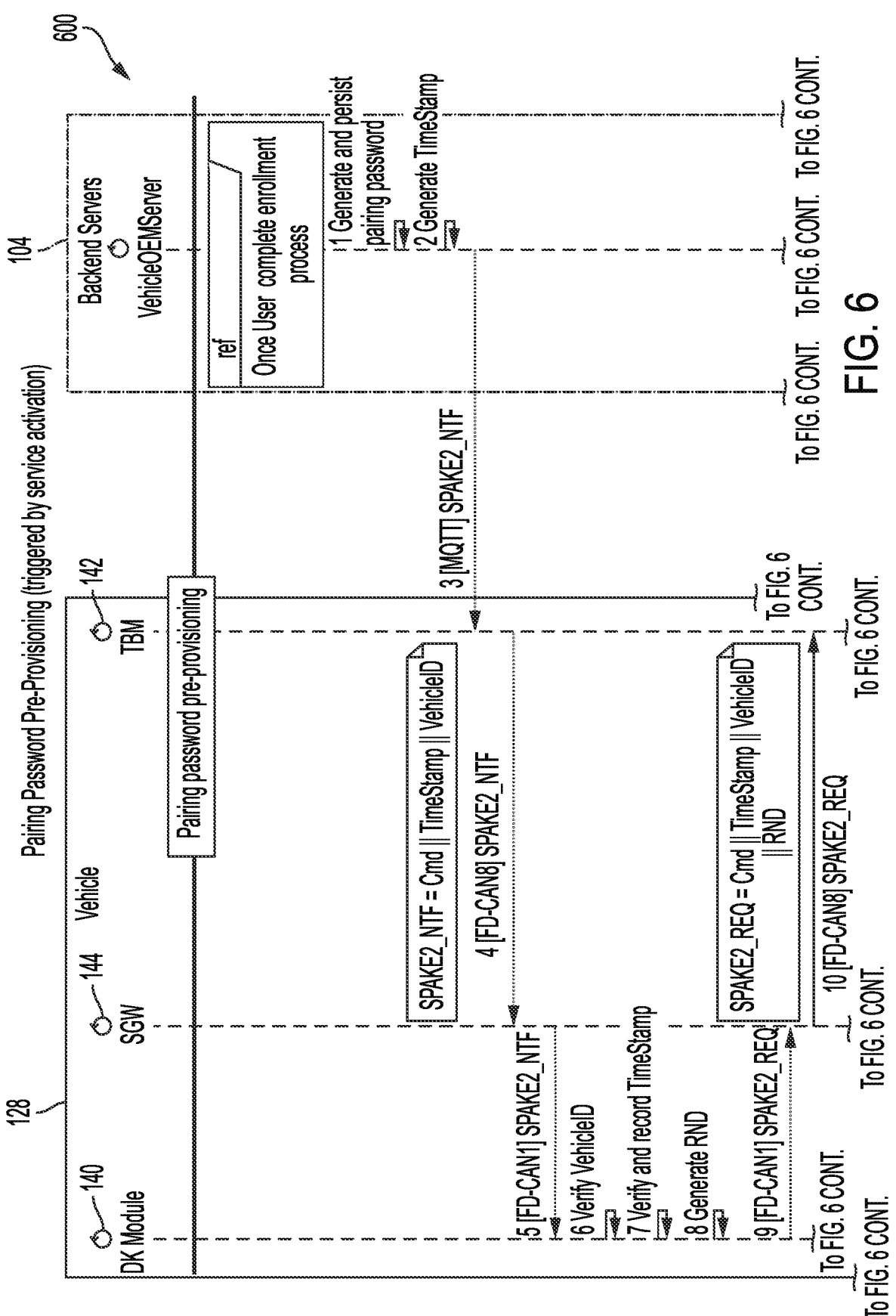
FIG. 6 is a control diagram of an example secure communication system for pre-provisioning a vehicle with pairing password verifiers for digital key programming with an offline vehicle, according to the principles of the present disclosure
Figure 6:
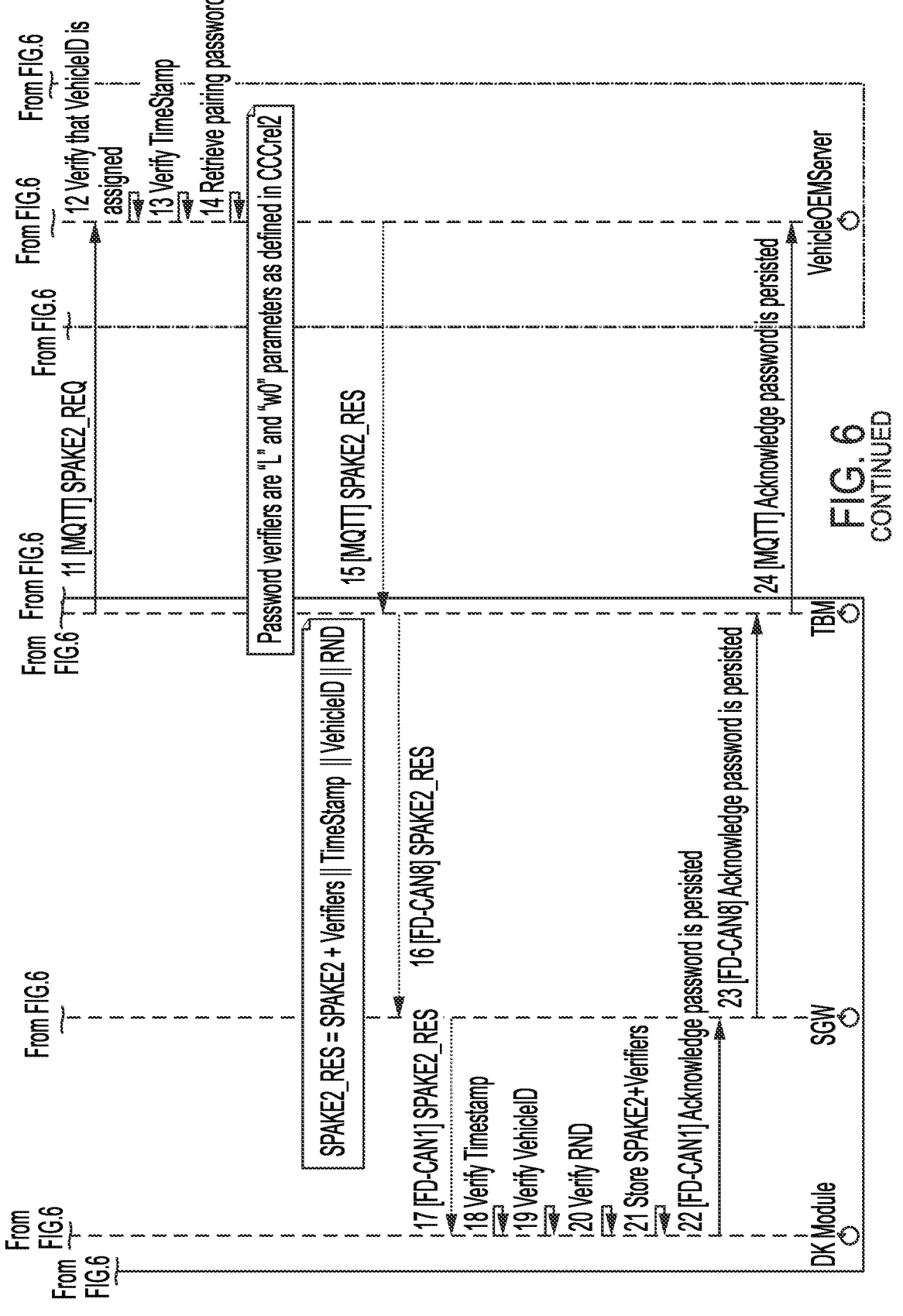

Referring now to FIG. 6, an example control diagram 600 illustrates the combined methods of FIGS. 4 and 5 where vehicle and OEM server communications for a pairing password pre-provisioning of digital keys are secured end to end for data freshness, uniqueness, and integrity.

With continued reference to FIG. 1, the vehicle 128 additionally includes a radio frequency (RF) hub 150 having a secure storage device key (SSDK). Embedded microcontrollers typically have limited secure storage to protect sensitive material and keys used to support a mobile device as a key. This is potentially problematic if the vehicle needs to support multiple devices or smart cards where each device shares a different set of keys and profile information with the vehicle. Accordingly, the described system expands limited secure storage in a vehicle ECU 152 to store larger sets of sensitive materials and keys without increasing the cost or upgrading to a more expensive controller by encrypting a file that contains other key material and profile information associated with at device. Since the file itself is encrypted, it can be placed in regular memory without being compromised, thus expanding the secure storage in the device memory without the need for additional secure storage.

In the example embodiment, the SSDK is a symmetric key (e.g., 128 bit AES key). The SSDK can be generated and programmed by at least one of (i) randomly generated by the RF hub hardware trust anchor (HTA—e.g., trust zone, secure elements, hardware security module, etc.) at first power up, and (ii) injected at component assembly location. The SSDK is stored in the HTA, which is configured to prevent read and write access to the SSDK. In the example embodiment, the SSDK is utilized to provide protection for a key store (KS) to store more keys or sensitive material in the embedded controller (e.g., ECU 152). The ECU 152 is configured to authenticate the mobile device 132 before allowing access. Such authentication requires sensitive information and/or profile information, which is to be protected in the SSDK in the ECU 152. The KS is configured as a collection of encrypted devices security parameters. Each device security parameter is encrypted with SSDK, the KS stores up to a predetermined number of devices security parameters (e.g., limited by non-volatile memory storage limitations). The encrypted KS content can be stored in the non-volatile memory of the RF hub 150. In this way, the system uses small secure storage to store a plurality of key materials used to encrypt content that can be stored in regular memory.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A communication system for a vehicle, the communication system comprising:

a network transceiver configured for communication via one or more networks with (i) at least one secure server, and (ii) an authorized mobile device; and a controller configured to:

detect the authorized mobile device;

receive personalized user settings from the mobile device or the at least one secure server, the personalized user settings set by a user of the authorized mobile device;

automatically adjust one or more systems and/or components of the vehicle according to the received personalized user settings; and upload the personalized user settings to the at least one secure server for storage, wherein the at least one secure server is configured to send the personalized user settings to one or more additional vehicles upon the one or more additional vehicles detecting the authorized mobile device such that systems and/or components of the one or more additional vehicles are automatically adjusted to the personalized user settings.

2. The communication system of claim 1, wherein the controller is further configured to:

receive updated personalized user settings from the mobile device or the at least one secure server, the updated personalized user settings updated by the user of the authorized mobile device; and automatically adjust the one or more systems and/or components of the vehicle according to the received updated personalized user settings.

3. The communication system of claim 1, wherein detecting the authorized mobile device further includes:

determining whether the user of the mobile device has a user profile; and if no user profile is found, prompting the user to create a new profile on the mobile device and storing the new profile at the at least one secure server.

4. The communication system of claim 1, wherein the controller is further configured to:

send, based on a command from the user at the vehicle or the authorized mobile device, the current user settings of the vehicle to the authorized mobile device to be subsequently named and saved.

5. The communication system of claim 1, wherein the personalized user settings include mirror position settings, steering wheel position, one or more button control settings, radio settings, media subscription credentials/settings, seat position settings, climate control settings, and navigation settings.

* * * * *